(12) United States Patent
Khafagy et al.

(10) Patent No.: US 10,597,024 B2
(45) Date of Patent: Mar. 24, 2020

(54) SYSTEM AND METHOD FOR POWERING START-STOP AND HYBRID VEHICLE COMPONENTS AND ACCESSORIES (71) Applicant: FORD GLOBAL TECHNOLOGIES, LLC, Dearborn, MI (US)

(72) Inventors: Hafiz Shafeek Khafagy, Dearborn, MI (US); Gjergji Shaska, Novi, MI (US); Kirk Pebley, Novi, MI (US); Marirose Ilkka, Royal Oak, MI (US); Zeljko Deljevic, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 349 days.

(21) Appl. No.: 15/066,669

(22) Filed: Mar. 10, 2016

(65) Prior Publication Data

US 2017/0259803 A1 Sep. 14, 2017

(51) Int. Cl.

| | |
|---|---|
| *B60W 20/13* | (2016.01) |
| *B60W 30/192* | (2012.01) |
| *B60W 10/06* | (2006.01) |
| *B60W 10/30* | (2006.01) |
| *B60W 10/26* | (2006.01) |
| *B60K 6/28* | (2007.10) |
| *B60W 10/08* | (2006.01) |

(Continued)

(52) U.S. Cl.
CPC .............. *B60W 20/13* (2016.01); *B60K 6/28* (2013.01); *B60W 10/06* (2013.01); *B60W 10/08* (2013.01); *B60W 10/26* (2013.01); *B60W 10/30* (2013.01); *B60W 20/40* (2013.01); *B60W 30/192* (2013.01); *B60K 2006/4825* (2013.01); *B60W 2710/305* (2013.01); *Y02T 10/6252* (2013.01); *Y02T 10/6278* (2013.01); *Y02T 10/6286* (2013.01)

(58) Field of Classification Search
CPC ............................ B60L 11/1868; B60W 10/26
USPC ....................................... 180/65.29
See application file for complete search history.

(56) References Cited

U.S. PATENT DOCUMENTS 6,476,571 B1 * 11/2002 Sasaki ...................... B60K 6/26
180/65.1
7,533,746 B2 * 5/2009 Yamaguchi ........... H02J 7/1423
180/65.28

(Continued)

*Primary Examiner* — Jeffrey J Restifo
(74) *Attorney, Agent, or Firm* — David Kelley; Brooks Kushman P.C.

(57) ABSTRACT

A vehicle includes an engine cranked by an electric machine powered by a first battery, a first plurality of components powered by the first battery, a second plurality of components powered by a second battery, and a processor programmed to isolate the second battery and associated components from the first battery and associated components at least during engine cranking. The first battery may be a low voltage battery having a first chemistry, such as a lead-acid battery with associated components that are less sensitive to voltage variation induced by engine cranking or starting, such as heated mirrors, seats, wipers, a climate control blower, power windows/doors, and auxiliary pumps. The second battery may be a low or high voltage battery having a second chemistry, such as a lithium-ion battery with associated components that may be more sensitive to low voltage during engine cranking/starting, such as lighting, electronics, and infotainment systems.

15 Claims, 3 Drawing Sheets

(51) Int. Cl.
  *B60W 20/40* (2016.01)
  *B60K 6/48* (2007.10)

(56) References Cited

U.S. PATENT DOCUMENTS

| | | | | |
|---|---|---|---|---|
| 7,997,364 | B2* | 8/2011 | Hashimoto | B60K 6/445 180/65.265 |
| 8,384,345 | B2* | 2/2013 | Hara | H01M 4/5825 320/104 |
| 8,395,278 | B2* | 3/2013 | Cawthorne | F02N 11/0866 307/10.3 |
| 8,565,953 | B2* | 10/2013 | Kato | B60K 6/365 307/104 |
| 10,112,612 | B2* | 10/2018 | Siddiqui | B60W 30/18018 |
| 2003/0088343 | A1* | 5/2003 | Ochiai | B60K 6/48 701/22 |
| 2004/0026140 | A1* | 2/2004 | Suzuki | B60K 6/485 180/65.26 |
| 2004/0099234 | A1* | 5/2004 | Tamai | B60K 6/485 123/179.3 |
| 2005/0014602 | A1* | 1/2005 | Hara | B60K 6/48 477/3 |
| 2008/0011528 | A1* | 1/2008 | Verbrugge | B60K 6/28 180/65.29 |
| 2008/0067973 | A1* | 3/2008 | Ishikawa | B60K 6/445 320/104 |
| 2010/0225258 | A1* | 9/2010 | Namuduri | B60K 6/485 318/400.3 |
| 2011/0049910 | A1* | 3/2011 | Izumi | B60K 6/48 290/38 R |
| 2012/0032634 | A1* | 2/2012 | Cavanaugh | B60L 1/003 320/109 |
| 2012/0105010 | A1* | 5/2012 | Kinoshita | H01M 4/5825 320/136 |
| 2012/0187919 | A1* | 7/2012 | Andersson | B60K 6/46 320/138 |
| 2013/0179014 | A1* | 7/2013 | Yamazaki | B60W 10/06 701/22 |
| 2013/0229049 | A1* | 9/2013 | Larsson | F02N 11/0814 307/9.1 |
| 2014/0046520 | A1* | 2/2014 | Katoch | B60L 3/0046 701/22 |
| 2014/0081561 | A1* | 3/2014 | Be | B60W 50/085 701/112 |
| 2014/0180517 | A1* | 6/2014 | Endo | B60W 20/1062 701/22 |
| 2014/0277866 | A1* | 9/2014 | Li | B60W 20/00 701/22 |
| 2014/0278019 | A1* | 9/2014 | Be | F02D 29/02 701/112 |
| 2015/0167614 | A1* | 6/2015 | Malone | F02N 11/0822 701/54 |
| 2015/0188188 | A1* | 7/2015 | Zhang | H01M 10/0525 429/9 |
| 2015/0197159 | A1* | 7/2015 | Lee | B60L 11/1851 701/22 |
| 2015/0202972 | A1* | 7/2015 | Sugiyama | B60W 30/18054 701/22 |
| 2015/0231982 | A1* | 8/2015 | Li | B60L 1/003 701/22 |
| 2015/0231986 | A1* | 8/2015 | Li | B60L 11/123 701/22 |
| 2015/0258950 | A1* | 9/2015 | Namuduri | B60L 15/20 701/22 |
| 2015/0307082 | A1* | 10/2015 | Nallapa | B60W 20/13 701/22 |
| 2015/0370264 | A1* | 12/2015 | Colvin | G05D 16/2066 701/51 |
| 2016/0059726 | A1* | 3/2016 | Berman | B60L 11/1851 701/22 |
| 2016/0185225 | A1* | 6/2016 | Namuduri | B60L 1/003 701/22 |
| 2016/0185237 | A1* | 6/2016 | Ha | B60L 11/1803 318/139 |
| 2016/0193993 | A1* | 7/2016 | Bolenbaugh | B60W 20/14 701/22 |
| 2016/0207541 | A1* | 7/2016 | Mansur | B60W 50/0098 |
| 2016/0229411 | A1* | 8/2016 | Murata | B60L 11/123 |
| 2016/0272191 | A1* | 9/2016 | Atluri | B60W 20/40 |
| 2016/0303946 | A1* | 10/2016 | Miller | B60H 1/3208 |
| 2016/0303992 | A1* | 10/2016 | Lovett | B60L 11/1868 |
| 2016/0325738 | A1* | 11/2016 | Miyazaki | B60L 3/0076 |
| 2016/0369733 | A1* | 12/2016 | Dokras | F02D 41/28 |

\* cited by examiner

SYSTEM AND METHOD FOR POWERING START-STOP AND HYBRID VEHICLE COMPONENTS AND ACCESSORIES

TECHNICAL FIELD

This application relates to systems and methods for powering electrical components and accessories in a hybrid vehicle or a start-stop vehicle.

BACKGROUND

Automatic start-stop vehicles stop the engine to save fuel when the vehicle is stopped or approaching a stop and then automatically restart the engine in anticipation of the vehicle moving. When the engine is stopped, various vehicle components or accessories may be powered by a battery, or the engine may be started in response to a component or accessory load that exceeds the available battery power, which reduces the fuel economy. A low voltage single battery (such as a 12V lead-acid battery) may be used to power the components and accessories, but has limited charge power capability due to the dynamic charge acceptance and battery chemistry and construction constraints. In addition, modern vehicles are equipped with more features and options that consume significant electric power. A single battery topology also makes it difficult to capture and store energy from sources that generate power, to maximize the use of the generated energy and stored energy, and to be able to efficiently use generated and stored energy to power the vehicle technology on demand. Due to the limited power availability, some systems inhibit operation and/or provide limited functionality of various features, components, or accessories when the engine is stopped. Furthermore, during engine cranking battery voltage may drop significantly and affect operation or functioning of various vehicle technology.

Start-stop vehicles may use a lithium-ion (Li-Ion) battery to overcome some of the power issues associated with a low voltage lead-acid battery. The Li-Ion battery may feed the entire power subsystem in the vehicle to provide a stable source of energy and to isolate all subsystems from the effects of engine cranking during auto-stopping, while the vehicle is auto-stopped, and during auto-starting. While providing various advantages, the energy cost (amp-hours) for the Li-Ion battery is relatively high compared to energy cost from a lead-acid battery.

Hybrid vehicles include an engine and an electric machine that operates as a motor/generator with an associated traction battery, which is typically a Li-Ion battery, to provide an electric vehicle (EV) mode using only electric power to propel the vehicle, or a hybrid electric vehicle (HEV) mode that uses the engine and motor to propel the vehicle. The Li-Ion battery for a hybrid vehicle typically has a much larger capacity than the battery for a stop-start vehicle due to its intended use. Hybrid vehicles may start the engine using a dedicated low voltage starter motor and/or various types and sizes of electric machines that may function as a motor/generator or an integrated starter-generator (ISG) with power provided by an associated low voltage battery lead-acid battery, or by the Li-Ion traction battery using associated power electronics and voltage converter. Similar to a stop-start vehicle, the engine may be started frequently under various operating conditions to meet driver demanded torque, to transition between EV and HEV operating modes, or to power vehicle systems or technology. Similar to the use of a Li-Ion battery to power technology in stop-start vehicles, the energy cost (amp-hours) for the Li-Ion battery is relatively high compared to energy cost from the lead-acid battery.

SUMMARY

In one or more embodiments, a vehicle includes an engine, an electric machine configured to crank the engine and powered by a first battery, a first plurality of electric components configured to receive power from the first battery, a second plurality of electric components configured to receive power from a second battery, and a processor programmed to electrically isolate the second battery and second plurality of components from the first battery and first plurality of components during engine cranking. The electric machine may include a starter motor or integrated starter-generator, for example. The processor may be further programmed to auto-start and auto-stop the engine in response to vehicle operating conditions and to electrically isolate the second battery and second plurality of components from the first battery and first plurality of components while the engine is auto-stopped and/or in response to an engine auto-stop request. In one or more embodiments, the first battery has battery chemistry different from the battery chemistry of the second battery. The first battery may be implemented by a low voltage lead-acid battery and the second battery may be implemented by a low voltage or high voltage lithium-ion battery. In hybrid vehicle embodiments, the vehicle may include a second electric machine configured to receive power from the second battery and to provide propulsive torque to the vehicle wheels.

Embodiments may include vehicles having a first plurality of electric components including only electric components having a voltage operating range within the voltage operating range of the first battery during engine cranking, engine running, and engine off conditions. The first plurality of electric components may include various electrically heated components, such as heated mirrors, heated wipers, heated seats, and defrosters for example. The first plurality of electric components may also include an auxiliary water pump, accumulator pump, climate control blower, power windows and doors, and similar components that are not sensitive to low voltage conditions associated with engine cranking and starting. The second plurality of electric components may include vehicle lighting systems, such as exterior lights, head lamps, brake lights, and fog lights. In some embodiments the second plurality of electric components includes electronics, telematics, and infotainment systems, electric power-assisted steering (EPAS), electronic parking brake, blind spot detection, and similar components or accessories that are more sensitive to voltage variations and low voltage associated with cranking and starting the engine.

In some embodiments, a vehicle includes a first battery having a first battery chemistry and electrically coupled to a first plurality of vehicle components and to a starter motor configured to crank an engine, and a second battery having a battery chemistry different from the first battery chemistry, electrically coupled to a second plurality of vehicle components and electrically isolated from the first battery and first plurality of components at least during engine cranking. The vehicle may include a processor programmed to electrically isolate the first battery from the second battery in response to operation of the starter motor. The first battery may be a low voltage battery and the second battery may be a battery having a nominal voltage of at least five times the low voltage battery. In one embodiment, the first battery is a battery having a nominal voltage less than 50V and the second battery is a battery having a nominal voltage of greater than 100V. The vehicle may include a processor operable to electrically isolate the first battery from the second battery in response to an engine auto-stop.

A method for controlling a vehicle according to various embodiments may include electrically isolating vehicle components powered by a first battery coupled to an electric machine configured for engine starting from vehicle components powered by a second battery at least during engine starting. The method may include electrically isolating by a controller operating a switch that electrically isolates the first battery from the second battery in response to an engine auto-stop. The method may also include electrically coupling the first battery and the second battery when not starting the engine.

Various embodiments may provide one or more advantages. For example, use of a first battery having an associated lower energy cost to power vehicle components and technology that is not sensitive to voltage supply variation associated with low voltage during engine cranking may reduce cost without impacting functionality or system performance for operation of electrically powered devices during an engine auto-stop and/or while cranking the engine during starting. Electric loads that can be operate or be load shed during engine stopping periods are coupled to a lower energy cost battery such as a lead-acid battery that also powers an electric machine to crank the engine, such as a starter motor or ISG, for example. Separating and powering electric loads using two batteries having different battery chemistries that can be electrically isolated during auto-stop periods and engine cranking may increase the availability and duration of engine stopping periods and associated cost reduction.

The above advantages and other advantages and features of various embodiments of the claimed subject matter may be recognized by those of ordinary skill in the art based on the representative embodiments described and illustrated.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As recognized by the inventors of this application, increased availability of engine auto-stop may improve vehicle efficiency in start-stop vehicles as well as various types of hybrid vehicles, such as full hybrids, plug-in hybrids, mild hybrids, and micro-hybrids, for example. Availability of engine auto-stop may be provided by reducing instances where auto-stop is inhibited or an auto-start is initiated associated with various electrically powered vehicle components, accessories, technology, etc. As such, various embodiments power electric loads that are less sensitive to power supply voltage variation and low voltage associated with engine auto-stops and the associated engine cranking and starting using a first battery, and other electric loads more sensitive to low voltage operation using a second battery. This provides increased availability of various vehicle components and features when the engine is auto-stopped, which may also increase the frequency and duration of the auto-stops. In addition, appropriate selection of battery chemistry, type, and size/capacity may reduce overall energy cost associated with charging and discharging the batteries over a wide range of operating and ambient conditions.

Figure 1:
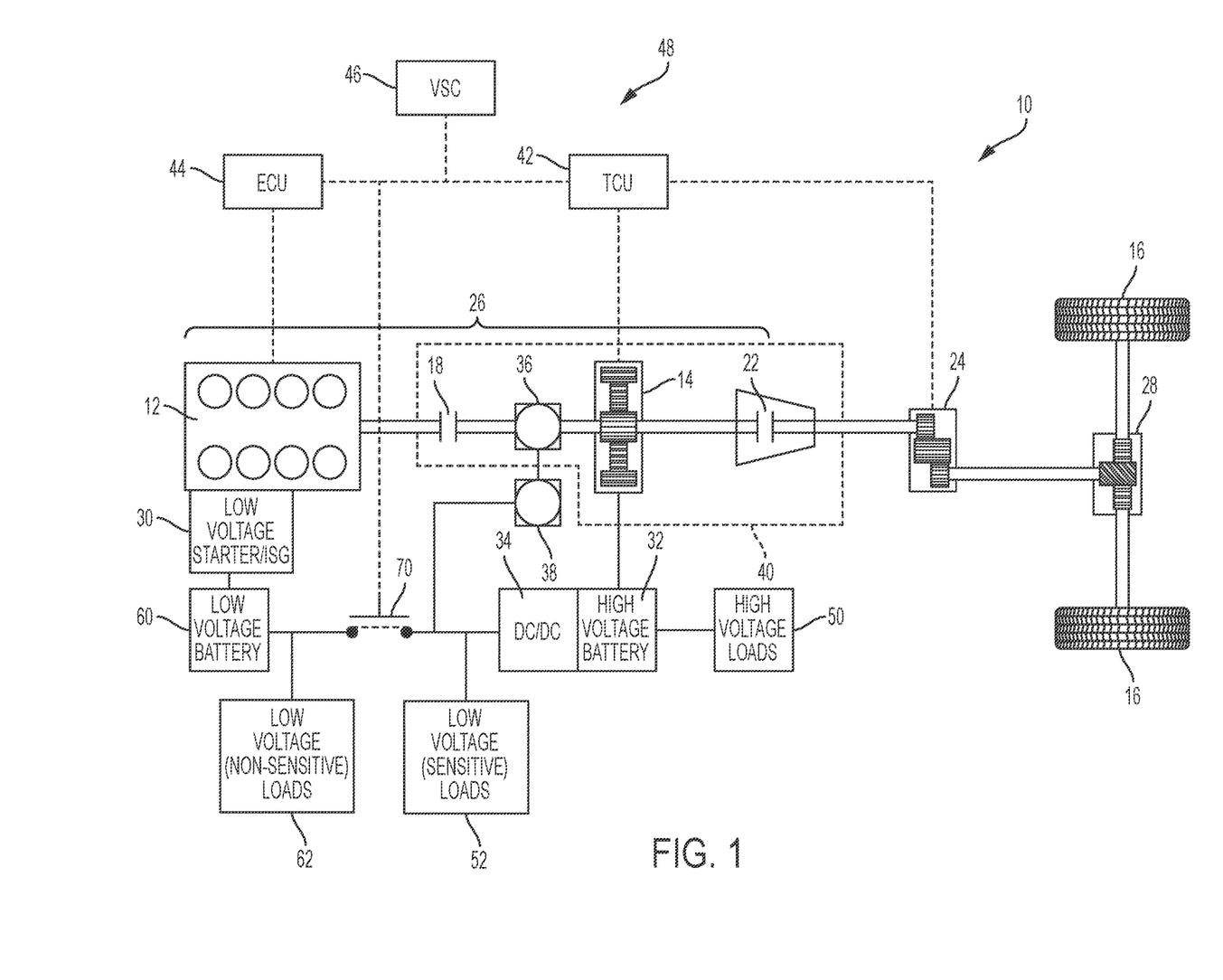
FIG. 1 is a schematic diagram illustrating a representative vehicle in a system or method for powering vehicle devices according to various embodiments.

FIG. 1 illustrates a schematic diagram of a hybrid vehicle 10 according to various representative embodiments. The vehicle 10 includes an engine 12, and an electric machine implemented by a motor generator (M/G) 14, which may also be referred to as a traction motor. The M/G 14 is configured to transfer torque to the engine 12 or to the vehicle wheels 16, depending on the particular operation mode. The M/G 14 is connected to the engine 12 using a first clutch 18, also known as a disconnect clutch, a first clutch, or an upstream clutch. The clutch 18 may also include a damper mechanism such as a series of plates and springs configured to dampen changes in torque transferred between the engine 12 and the M/G 14 when the disconnect clutch 18 is being engaged. A second clutch 22, also known as a launch clutch or downstream clutch, connects the M/G 14 to a transmission 24. The launch clutch 22 may be controlled to decouple or isolate the driveline 26, which includes the M/G 14 and the engine 12, from the transmission 24, differential 28, and the vehicle drive wheels 16. Although the clutches 18, 22 are described and illustrated as hydraulic clutches, other types of clutches, such as electromechanical clutches may also be used. Alternatively, clutch 22 may be replaced with a torque converter having a bypass clutch as described in greater detail herein. In various embodiments, the downstream clutch 22 refers to various coupling devices for the vehicle 10 including a traditional clutch, and a torque converter having a bypass (lock-out) clutch.

The engine 12 output shaft is connected to the disconnect clutch 18, which in turn is connected to the input shaft for M/G 14. The output shaft of M/G 14 is connected to the launch clutch 22, which in turn is connected to the transmission 24. The components of driveline 26 of the vehicle 10 are positioned sequentially in series with one another in the representative embodiment illustrated. Those of ordinary skill in the art will recognize various other alternative configurations for a hybrid vehicle and associated powertrain that may be incorporate various features according to the present disclosure relative to powering a first plurality or group of components, accessories, equipment, etc. from a first battery and a second plurality or group of components, accessories, equipment, etc. from a second battery. Similarly, while a full hybrid is illustrated, various embodiments may include a mild hybrid, plug-in hybrid, micro-hybrid, and similar types of vehicles, as well as automatic stop-start vehicles that have conventional powertrains with an engine that may be automatically stopped and started in response to various vehicle and ambient operating conditions. Likewise, for any of the hybrid or automatic start-stop vehicles, the powertrain components and configuration may vary and may include a continuously variable transmission (CVT), automated mechanical transmission (AMT), step-ratio automatic transmission, manual transmission, gasoline or Diesel engine, etc.

Engine 12 may be cranked and started using M/G 14 to rotate the engine 12 using torque provided through clutch 18, or using an alternative starting device, such as another electrical machine that may be implemented by a low voltage starter motor 30, integrated starter-generator (ISG), or similar device operatively connected to the engine 12. The starting device or motor 30 may be used to provide torque to start the engine 12 without the addition of torque from the M/G 14.

As also illustrated in FIG. 1, M/G 14 is in communication with a battery 32. The battery 32 may be a high voltage battery, which may also be referred to as a traction battery or battery pack having a number of individual battery cells and associated battery chemistry. In some embodiments, such as those for a mild hybrid or start-stop vehicle, battery 32 may be implemented by a low-voltage battery. M/G 14 may be configured to charge the battery 32 in a regeneration mode, for example when vehicle power output exceeds driver demand, through regenerative braking, or the like. In one example, battery 32 is configured to connect to an external electric grid, such as for a plug-in electric hybrid electric vehicle (PHEV). Battery 32 may be configured to provide power to a plurality of corresponding electric components, features or technology, represented by high voltage loads 50 in this embodiment. Similarly, high voltage battery 32 may be coupled to a plurality of vehicle electric components that are sensitive to voltage variation or low voltage as represented by low voltage loads 52 through a DC/DC converter to step down voltage from high voltage battery 32.

A low voltage battery 60 may also be provided to supply power to an electric machine represented by starter motor/ISG 30 in this embodiment for cranking and starting engine 12. Low voltage battery 60 has a battery chemistry different from high voltage battery 32. In one embodiment, low voltage battery 60 is a lead-acid battery and high-voltage battery 32 is a lithium-ion (Li-Ion) battery. Various other combinations of batteries with different battery chemistries may be used such as NiMH, Zn-Air, or various types of Li-Ion batteries having an anode or negative electrode typically made of graphite and a cathode made of cobalt dioxide, nickel-cobalt-manganese (NCM), nickel-cobalt-aluminum (NCA), or iron phosphate (FePo), for example.

A low voltage battery as referenced in this application generally refers to a battery having a nominal voltage of less than 50V, with common nominal voltages of 12V, 24V, and 48V, for example. A high voltage battery as referenced in this application generally refers to a battery having a nominal voltage of 100V or higher with traction batteries having nominal voltages from 100V to 600V or higher depending on the particular application and implementation.

Low voltage battery 60 may be configured to power a plurality of vehicle components, features, accessories, or technology that is less sensitive to supply voltage variation and low voltage that may be induced during cranking of the engine by starter 30 as generally represented by low voltage loads 62. In the embodiment illustrated in FIG. 1, low voltage battery 60 and low voltage (non-sensitive) loads 62 are selectively electrically coupled to or isolated from low voltage loads (sensitive) 52, high voltage battery 32, and high voltage loads 50 based on the closed or open state, respectively, of switch or contactor 70, which is controlled by one or more vehicle controllers. Switch or contactor 70 may be operated in response to an engine auto-stop, in response to engine cranking, or in response to an engine auto-start to electrically isolate low voltage loads 52 and high voltage loads 50 from low voltage loads 62 and low voltage battery 60. Switch or contactor 70 may be closed to couple low voltage battery 60 and high voltage battery 32 to provide additional power to various vehicle accessories or components, or to charge either or both batteries when one of the electric machines is operating as a generator. In some embodiments, switch or contactor 70 may be omitted such that each battery and its associated electrically powered components, features, accessories, or technology are permanently electrically isolated from one another by the system power distribution architecture.

With continuing reference to FIG. 1, pressurized fluid for the transmission may be provided by a transmission pump 36 connected to or adjacent to an electric machine or traction motor/generator 14 such that it rotates with the motor/generator 14 and the driveshaft to provide pressurized transmission fluid to the gearbox. Alternatively, or in combination, an electrically powered auxiliary pump 38 may also be provided. Electrically powered auxiliary pump may be powered directly or indirectly by battery 32 depending on the operating voltage of the pump and whether battery 32 is implemented by a high voltage or low voltage battery. Traction motor/generator 14, clutches 18, 22, and transmission pump 36 may be located within a motor generator case 40, which may be incorporated into the case for transmission 24, or alternatively, is a separate case or housing within the vehicle 10.

Vehicle 10 may include various controllers or control units configured to operate associated vehicle systems, subsystems, or components. One or more vehicle controllers and related electronics may be more sensitive to voltage variation and low voltage associated with engine cranking. As such, the vehicle controllers may be powered by battery 32, which may be electrically isolated from battery 60 at least during engine cranking. In the embodiment illustrated, vehicle 10 includes a transmission control unit (TCU) 42 configured or programmed to operate transmission 24 and M/G 14, an engine control unit (ECU) 44 configured or programmed to control operation of engine 12, including control of low voltage starter/ISG 30 for cranking and starting engine 12 as well as auto-stop/auto-start operation of engine 12 based on ambient and vehicle operating conditions. A vehicle system controller (VSC) 46 transfers data between TCU 42 and ECU 44 and is also in communication with various vehicle sensors and driver inputs. The control system 48 for vehicle 10 may include any number of controllers, and may be integrated into a single controller, or have various modules. Some or all of the controllers may be connected by a controller area network (CAN) or other system.

When vehicle 10 is being operated it may experience a series of situations and driving conditions that can be termed use cases, or operating conditions. Use cases categorize various driver commands (e.g., accelerator pedal position, brake pedal position, gear lever, etc.) and vehicle conditions (vehicle speed, clutch states, gear ratios, temperatures, etc.) into groupings that may be used by the control system 48 to control vehicle 10. A number of use cases may result in a start request for engine 12 and corresponding control of low voltage starter/ISG and switch or contactor 70 to electrically isolate loads 62 that are less sensitive to low voltage from loads 52 that are more sensitive to low voltage at least during engine cranking. For example, in one use case the vehicle 10 is stationary with the gear lever in drive and the brake engaged, and the VSC 46 may request an engine start (also referred to as an auto-start) based on the state of charge (SOC) of battery 32 being below a threshold. In another example, the vehicle 10 is in motion in an electric-only (EV) mode at a steady speed (with engine 12 disconnected and off) and the accelerator pedal has a tip-in such that VSC 46 determines that the additional power request requires an engine start.

Some use cases involve starting the engine 12 while the launch clutch 22 (or torque converter with a lock out or bypass clutch) is open, slipping, or engaged. Differing states of the launch clutch 22 require different engine start sequences based upon how various actuators and inputs, such as the M/G 14, engine 12, starter motor 30, and clutches 18, 22, are operated and controlled to achieve the desired engine start. Starting engine 12 using electric machine and engaging clutch 18 would not result in a voltage transient associated with operation of starter/ISG 30 such that switch or contactor 70 may remain closed during such an engine start without adversely affecting operation of voltage sensitive components.

One or more vehicle or system controllers, such as TCU 42, ECU 44, and VSC 46, may include a microprocessor, processor, or central processing unit (CPU) in communication with various types of non-transitory computer readable storage devices or media. Non-transitory computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling starting of the engine and associated components or systems of the vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, TCU 42, ECU 44, and VSC 46 may communicate signals to and/or from engine 12, electric machine 14, transmission gearbox 24, disconnect clutch 18, launch clutch 22, power electronics and DC/DC converter 34, electrical machine 30, and switch or contactor 70. In addition, one or more controllers may perform load shedding operations to selectively disconnect or power down one or more electrical components while engine 12 is auto-stopped to conserve battery capacity and/or extend the duration of an auto-stop event.

Although not explicitly illustrated, those of ordinary skill in the art will recognize various functions or components that may be controlled by one or more of the controllers. Representative examples of parameters, systems, and/or components that may be directly or indirectly actuated using control logic executed by the controllers include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, operation of electric machine 14, operation of electric machine (low voltage starter 30), operation of contactor 70, clutch pressures for disconnect clutch 18, launch clutch 22, and transmission gearbox 24, and the like. Other representative systems and components are illustrated and described with respect to FIG. 2. Sensors communicating input through the I/O interface may be used to indicate turbocharger boost pressure, crankshaft position, engine rotational speed or rotational position, wheel speeds, vehicle speed, coolant temperature, intake manifold pressure, accelerator pedal position, ignition switch position, throttle valve position, air temperature, exhaust gas oxygen or other exhaust gas component concentration or presence, intake air flow, transmission gear, ratio, or mode, transmission oil temperature, transmission turbine speed, torque converter bypass clutch status, deceleration or shift mode, for example.

Figure 3:
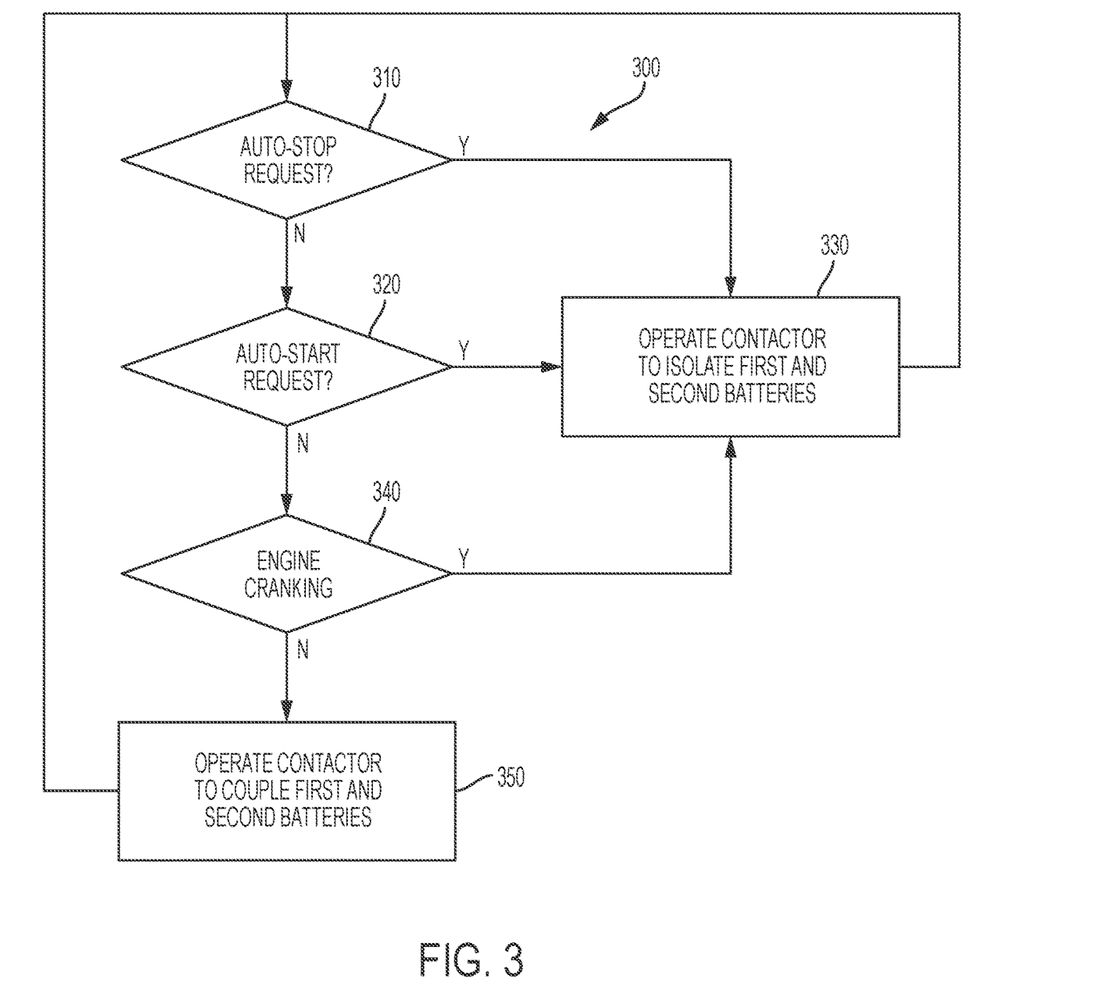
FIG. 3 is a flow chart illustrating operation of a system or method for controlling a vehicle having groups of components or accessories powered by different batteries.

Control logic or functions performed alone or in combination by one or more controllers may be represented by flow charts or similar diagrams in one or more figures, such as the flowchart of FIG. 3, for example. The flowchart of FIG. 3 illustrates a representative control strategy and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as TCU 42, ECU 44, and VSC 46. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer or processor to perform a method to control the vehicle or its subsystems. The computer-readable storage devices or media may include one or more of a number of known physical devices which utilize electric, magnetic, and/or optical storage to keep executable instructions and associated calibration information, operating variables, and the like.

To drive the vehicle with the engine 12, the disconnect clutch 18 is at least partially engaged to transfer at least a portion of the engine torque through the disconnect clutch 18 to the electric machine 14, and then from the electric machine 14 through the clutch 22, gearbox 24, and final drive 28. The electric machine 14 may assist the engine 12 by providing additional power to turn the electric machine input/output shaft. This operation mode may be referred to as a "hybrid mode", "hybrid electric vehicle (HEV)" mode, or an "electric assist mode." The engine may be started using an electric machine (implemented by low voltage starter 30 in this embodiment) with disconnect clutch open, or by at least partially engaging disconnect clutch 18 to crank the engine using torque from electric machine 14. An engine start request may be generated based on various operating conditions to provide driver demanded torque to wheels 16. For example, an engine start request may be generated in response to available torque from electric machine 14 being insufficient to deliver the driver demanded torque, which may be associated with the state of charge of battery 32, a selected operating mode (such as HEV), or to power one or more vehicle accessories, for example.

To drive the vehicle using electric machine 14 as the sole power source, the power flow remains the same except the disconnect clutch 18 is opened and isolates or decouples the engine 12 from the remainder of the powertrain. Combustion in the engine 12 may be disabled or otherwise OFF during this time to conserve fuel. The traction battery 32 transmits stored electrical energy to power electric machine 14. This operation mode may be referred to as an "electric only" or "electric vehicle (EV)" operation mode. An engine start request may be generated when operating in EV mode in response to similar operating conditions as described above with respect to operating in HEV mode.

In any mode of operation, electric machine 14 may act as a motor and provide a driving force for the powertrain. Alternatively, electric machine 14 may act as a generator and convert kinetic energy from the powertrain into electric energy to be stored in the battery 20, such as during regenerative braking, for example. Electric machine 14 may act as a generator while the engine 12 is providing propulsion power for the vehicle 10, for example. As illustrated and described in greater detail with respect to FIGS. 2-3, TCU 42, ECU 44, and/or VSC 46 may select one of the electric machines to crank or start engine 12 in response to an engine start request and control contactor 70 to isolate selected electrical loads at least during engine cranking when electric machine 30 is selected for starting engine 12. Depending on the selected electric machine, various other components, such as disconnect clutch 18, launch clutch 22, gearbox 24, pump 36, etc. may also be controlled to provide desired drivability and system performance during engine cranking and starting.

Figure 2:
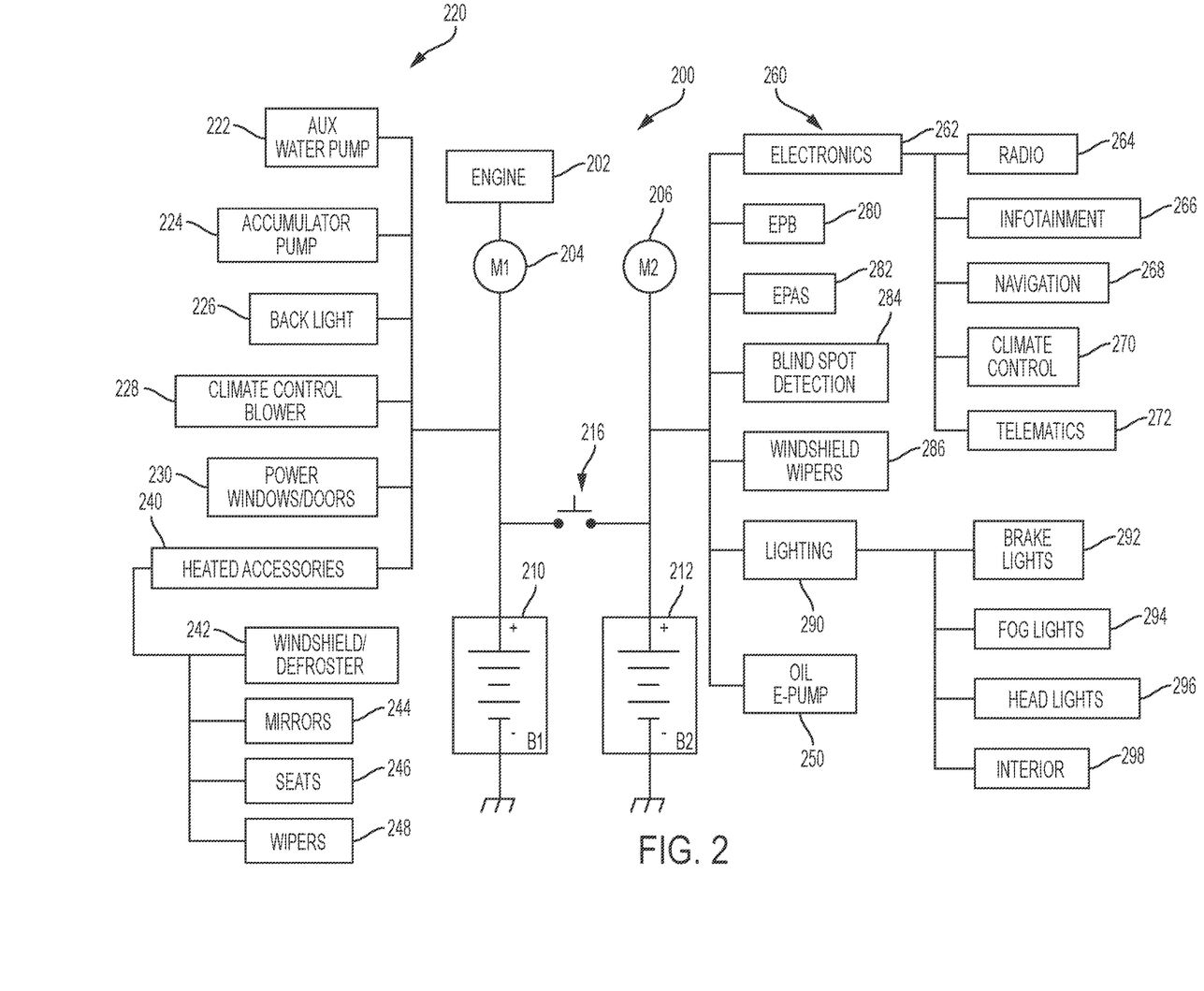
FIG. 2 is a block diagram illustrating representative vehicle electric components that may be powered by different batteries.

FIG. 2 illustrates representative electric loads that may be isolated in response to an engine auto-stop request, auto-start request and/or engine cranking in one or more embodiments. Vehicle electrical system 200 includes an engine 202 coupled to a first electric machine 204 powered by a first battery 210 having an associated battery chemistry and nominal operating voltage. In various embodiments, first battery 210 is a low voltage lead-acid battery having a nominal operating voltage of 12V, which may drop to as low as 7V when electric machine 204 is cranking engine 202. Various embodiments may also include a second electric machine 206 coupled to a second battery 212.

First battery 210 is coupled to a first plurality of vehicle components, accessories, features, technology, etc. as generally represented at 220. Components 220 are less sensitive to voltage variation and low voltage that may be induced by operation of electric machine 204 during engine cranking. Categories of electrical loads that are considered less sensitive loads are those loads where a short disturbance or stop of the functionality will not be noticeable by the customer or impact safety or drivability of the vehicle. These loads may generally include those that are:

1) Mainly resistive loads, such as heated windshield (HWS), heated back light, heated seats, seat positioners, etc.; and
2) Components that do not include a control module or other component that would reset when subjected to supply voltage variation or low voltage.

Components 220 may have specified operating supply voltage ranges consistent with the operating voltage range of battery 210. For example, battery 210 may have a nominal voltage of 12V with an operating voltage range of 7V-16V while components 220 can operate with supply voltage ranging from 5V-24V. Components 220 that are less sensitive to supply voltage variations and that can operate at voltages expected at least during engine cranking may include an auxiliary water pump 222, an accumulator pump 224, a backlight 226, a climate control blower 228, power windows/doors 230, and various heated accessories 240, for example. Heated accessories 240 may include a heated windshield and/or defroster 242, heated mirrors 244, heated seats 246, and heated wipers 248, for example.

As also illustrated in FIG. 2, system 200 may include a second plurality of vehicle components, accessories, features, or technology, generally represented at 260, that are more sensitive to supply voltage variation and low voltage that may be induced during operation of electric machine 204 if connected to the same power supply. This category of electrical loads that may be more sensitive to voltage variation or low voltage may include:

1) Components that have operation/performance specifications subject to regulatory requirements, such as lighting that may otherwise dim or flicker during cranking;
2) Components that may exhibit a noticeable change of functionality by a customer/user, such as a radio, navigation, infotainment, etc.;
3) Components related to vehicle safety, such as a blind spot detection, restraint system, and the like;
4) Components that the customer/user desires to remain functional during auto-stop, such as electric power assisted steering (EPAS); and
5) Components that may reset in response to voltage variations, such as electronic control modules.

As such, components 260 are powered by second battery 212, which is isolated from battery 210 by contactor 216 at least during engine cranking, and in some embodiments in response to an auto-stop request, during an auto-stop event, or in response to an auto-start request. Battery 212 has an associated battery chemistry different from the battery chemistry of battery 210. In various embodiments, battery 212 is a lithium-ion battery and may be a low voltage or high voltage battery. Batteries 210 and 212 may include a number of battery cells connected in series to provide a desired nominal operating voltage.

Components 260 may include an oil e-pump 250 and various types of electronics 262, such as a radio 264, infotainment system 266, navigation system 268, climate control system 270, and telematics system 272. Other components 260 may include an electric parking brake (EPB) 280, electric power assisted steering (EPAS) 282, blind spot detection 284, windshield wipers 286, and vehicle lighting 290, which may include brake lights 292, fog lights 294, head lights 296, interior lights 298, etc.

Contactor 216 may be operated by one or more vehicle controllers to selectively couple and decouple electric machine 204, first battery 210, and first plurality of components 220 to second electric machine 206, second battery 212, and second plurality of components 260. Batteries 210, 212 may be coupled when electric machine is not operating as a motor to crank engine 204. In embodiments where electric machine 204 is implemented by an ISG, electric machine 204 may be operated as a generator to charge battery 210 and/or battery 212 when contactor 216 is closed to couple the batteries. Similarly, electric machine 206 may be operated as a generator to charge battery 212, and to charge battery 210 when contactor 216 is closed to couple the batteries.

FIG. 3 is a flowchart illustrating operation of a representative system or method according to various embodiments. System or method 300 may determine whether an engine auto-stop request has been generated based on current vehicle and ambient operating conditions as represented at 310. Block 320 then determines whether an engine auto-start request has been generated, and block 340 determines whether the engine is cranking. A contactor, relay, switch or similar device may be operated to electrically isolate first and second batteries and associated first and second groups or pluralities of components as represented at 330 in response to an engine auto-stop request at 310, an engine auto-start request at 320, or during engine cranking at 340. Otherwise, the contactor or similar device may be operated to couple the first and second batteries for charging, load sharing, etc. as represented at 350. The first and second batteries may be coupled directly or indirectly through associated power electronics or converters depending on the corresponding battery operating voltages.

While one or more embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that may not be explicitly described or illustrated. Various embodiments may have been described as providing advantages or being preferred over other embodiments or prior art implementations with respect to one or more desired characteristics. However, as one of ordinary skill in the art is aware, one or more features or characteristics may be compromised to achieve desired overall system attributes, which depend on the specific application and implementation. These attributes may include, but are not limited to: cost, strength, security, durability, life cycle cost, marketability, appearance, packaging, size, serviceability, weight, manufacturability, ease of assembly, etc. Embodiments described as less desirable than other embodiments or prior art implementations with respect to one or more characteristics are not outside the scope of the disclosure or claims and may be desirable for particular applications.

What is claimed is:

1. A vehicle comprising:
an engine;
an electric machine configured to crank the engine and powered by a first battery;
a first plurality of electric components configured to receive power from the first battery;
a second plurality of electric components configured to receive power from a second battery; and
a processor programmed to auto-start and auto-stop the engine in response to vehicle operating conditions and to electrically isolate the second battery and second plurality of components from the first battery and first plurality of components during engine cranking, and while the engine is auto-stopped.

2. The vehicle of claim 1 wherein the first battery has a battery chemistry different from the second battery.

3. The vehicle of claim 2 wherein the first battery comprises a lead-acid battery and the second battery comprises a lithium-ion battery.

4. The vehicle of claim 3, the lithium ion battery comprising a low voltage battery.

5. The vehicle of claim 1 further comprising a second electric machine configured to receive power from the second battery.

6. The vehicle of claim 5, the second electric machine configured to provide propulsive torque to the vehicle.

7. The vehicle of claim 6 wherein the electric machine comprises a low voltage starter motor.

8. The vehicle of claim 1 wherein the first plurality of electric components includes only electric components having a voltage operating range within the voltage operating range of the first battery during engine cranking, engine running, and engine off conditions.

9. The vehicle of claim 1 wherein the first plurality of electric components comprises electrically heated components.

10. The vehicle of claim 1 wherein the second plurality of electric components comprises vehicle lighting components.

11. A vehicle comprising:
an engine;
an electric machine configured to crank the engine and powered by a first battery;
a first plurality of electric components configured to receive power from the first battery;
a second plurality of electric components configured to receive power from a second battery; and
a processor programmed to auto-start and auto-stop the engine in response to vehicle operating conditions and to electrically isolate the second battery and second plurality of components from the first battery and first plurality of components in response to an engine auto-stop request, and during engine cranking.

12. A vehicle comprising:
a first battery having a first battery chemistry and electrically coupled to a first plurality of vehicle components and to a starter motor configured to crank an engine; and
a second battery having a battery chemistry different from the first battery chemistry, electrically coupled to a second plurality of vehicle components and electrically isolated from the first battery and first plurality of components at least during engine cranking wherein the first battery is electrically isolated from the second battery in response to an engine auto-stop.

13. The vehicle of claim 12 further comprising:
a processor programmed to electrically isolate the first battery from the second battery in response to operation of the starter motor.

14. The vehicle of claim 12 wherein the first battery comprises a low voltage battery and the second battery comprises a battery having a nominal voltage of at least five times the low voltage battery.

15. The vehicle of claim 12 wherein the first battery comprises a battery having a nominal voltage less than 50V and the second battery comprises a battery having a nominal voltage of greater than 100V.

* * * * *